United States Patent
Knoop et al.

(10) Patent No.: US 7,035,735 B2
(45) Date of Patent: Apr. 25, 2006

(54) METHOD AND DEVICE FOR AUTOMATICALLY TRIGGERING A DECELERATION IN A MOTOR VEHICLE

(75) Inventors: Michael Knoop, Ludwigsburg (DE); Goetz Braeuchle, Reichertshausen (DE); Hermann Winner, Bietigheim (DE); Michael Weilkes, Sachsenheim (DE); Martin Heinebrodt, Stuttgart (DE); Werner Uhler, Bruchsal (DE); Wolfgang Hermsen, Kirchheim (DE); Joachim Thiele, Tamm (DE); Martin Staempfle, Ulm (DE); Fred Oechsle, Ludwigsburg (DE); Ulf Wilhelm, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/380,260

(22) PCT Filed: Jul. 11, 2002

(86) PCT No.: PCT/DE02/02543

§ 371 (c)(1),
(2), (4) Date: Aug. 8, 2003

(87) PCT Pub. No.: WO03/006289

PCT Pub. Date: Feb. 23, 2003

(65) Prior Publication Data

US 2004/0019426 A1    Jan. 29, 2004

(30) Foreign Application Priority Data

Jul. 11, 2002 (DE) ................................. 101 33 028

(51) Int. Cl.
*G06F 17/00* (2006.01)
*B60T 7/22* (2006.01)
(52) U.S. Cl. .................. 701/301; 701/96; 340/903; 180/169; 342/71

(58) Field of Classification Search ............... 340/436; 180/169; 342/71; 701/96
See application file for complete search history.

(56) References Cited

U.S. PATENT DOCUMENTS 5,332,056 A * 7/1994 Niibe et al. .................. 180/169

(Continued)

FOREIGN PATENT DOCUMENTS

| DE | 195 47 111 | 6/1997 |
| DE | 197 48 898 | 5/1998 |

OTHER PUBLICATIONS

Winner, Witte et al., Adaptive Cruise Control System—Aspects and Development Trends, SAE paper 96 10 10, SAE International Congress and Exposition, Detroit, Michigan, Feb. 26-29, 1996.*

*Primary Examiner*—Thomas G. Black
*Assistant Examiner*—Christine M. Behncke
(74) *Attorney, Agent, or Firm*—Kenyon & Kenyon

(57) ABSTRACT

A method and a device for automatically triggering a deceleration of a vehicle so as to prevent a collision with another object. Objects in the range of the vehicle's course being detected using signals of an apparatus for sending and receiving radar signals or lidar signals, or of an apparatus for receiving video signals. An endangerment potential is determined as a function of the objects detected, and when a predefined endangerment potential theshold value, which may be less than the triggering threshold value for the deceleration, is exceeded, the deceleration means of the vehicle are reset to a state in preparation for braking. Furthermore, additional vehicle functions may be carried out when the endangerment potential threshold value is exceeded, whereby passenger safety in this travel situation is enhanced.

5 Claims, 2 Drawing Sheets

U.S. PATENT DOCUMENTS

| | | | |
|---|---|---|---|
| RE35,920 E * | 10/1998 | Sorden et al. | 342/457 |
| 5,984,433 A * | 11/1999 | Stumpe et al. | 303/155 |
| 6,085,151 A * | 7/2000 | Farmer et al. | 701/301 |
| 6,179,080 B1 * | 1/2001 | Kikuchi | 180/169 |
| 6,292,753 B1 * | 9/2001 | Sugimoto et al. | 701/301 |
| 6,427,111 B1 * | 7/2002 | Dieckmann | 701/96 |
| 6,473,681 B1 * | 10/2002 | Eckert et al. | 701/70 |

* cited by examiner

METHOD AND DEVICE FOR AUTOMATICALLY TRIGGERING A DECELERATION IN A MOTOR VEHICLE

FIELD OF THE INVENTION

The present invention relates to a method and a device for automatically triggering a deceleration of a vehicle to prevent a collision with another object or to reduce damages associated with an impending collision with another object.

BACKGROUND INFORMATION

More systems for distance control and speed control have become available, which extend the functionality of the customary vehicle-speed controller (cruise control) to the extent that when a slower, preceding vehicle is detected ahead of one's own vehicle, the speed control is switched over to a distance control, and the preceding vehicle is followed at the same speed at which it is traveling. The basic method of functioning of such distance regulating and speed regulating systems is discussed in the paper "Adaptive Cruise Control System—Aspects and Development Trends", by Winner, Witte et al., SAE Paper 96 10 10, delivered at SAE International Congress and Exposition, Detroit, Feb. 26–29, 1996.

In German Published Application No. 195 47 111 a method and a device for controlling the braking system of a vehicle is discussed, in which, even before the beginning of a wheel slip traction control, pressure is input into the wheel brakes if predefined conditions exist, during which no significant braking effect is applied to the drive wheels.

SUMMARY OF THE INVENTION

The present invention provides a method and an associated device for automatically triggering the deceleration of a vehicle to avoid a collision or to reduce the consequences of an imminent collision with a further object. According to an exemplary embodiment of the present invention, signals of an apparatus for sending out and receiving radar signals or lidar signals, or of an apparatus for receiving video signals, which detect objects in the range of the vehicle's course, are supplied to the device.

According to a further exemplary embodiment, additional sensors which record the vehicle environment may also supply signals to this apparatus. Additionally, signals from devices in the vehicle, from which the vehicle's own travel behavior may be described, may be drawn upon in this regard. The device may further include an endangerment potential apparatus for determining an endangerment potential as a function of the detected objects, into which, for example, the probability of a collision with an object detected by the vehicle environment sensor system is entered. Advantageously, the endangerment potential may take into account a plurality of values, so that it may adequately describe the complexity of the situation to be expected. The vehicle deceleration apparatus may be prepared for the impending deceleration as a function of the endangerment potential, in order to decrease the response time when triggered.

According to an exemplary embodiment of the present invention, the deceleration devices are prepared for braking the vehicle as a function of the endangerment potential such that a braking pressure is built up in the braking system which precharges the braking system and sets the brake linings against the brake disks so that no significant vehicle deceleration takes place. When triggered, the brake pressure may be built up substantially faster, whereby an abbreviation of the response times of the deceleration effect comes about.

According to a further exemplary embodiment, additional vehicle functions are carried out as a function of the endangerment potential which increase the safety of the vehicle's occupants in the case of an unavoidable collision. In this context, operations come into consideration which put the drive train of the vehicle into a state in which driving force no longer acts on the vehicle's wheels, such as, for example, a reduction in the engine's rotational speed to idling speed, or a deactivation of the engine by switching off the ignition system or making no further fuel injections. According to further implementations, the driving force transmission to the wheels may be accomplished by influencing the transmission by putting in a neutral transmission stage, or alternatively, by setting the transmission is to an idle state.

Further advantageous operations by which passenger safety may be enhanced may include preparation of passenger restraint means. Reversible restraint systems, such as seat belt tensioners, may force the passengers into the correct sitting position, so that, in the case of an unavoidable collision, the irreversible restraint systems, such as airbags, may develop their full effect. In addition, in preparation, the triggering threshold of this irreversible restraint system may be changed, as a function of the particular driving situation and the detected object movement, in such a way that the restraint systems are triggered at the optimal time and with a force adapted to the particular situation.

Other traffic participants may be informed about the impending collision by advantageously switching on the hazard warning system, by activating the horn or by informing the subsequent vehicle on the imminent collision, with the aid of a radio transmission. To accomplish this communication, both one's own vehicle and the following vehicles may be outfitted with an appropriate wireless communications interface.

According to a further exemplary embodiment, the data flowing in before the collision, data from the environmental sensor system and also data pertaining to one's own travel situation sensors is stored in a nonvolatile memory. In this way, the accident details may be cleared up after the event, and a further development of triggering algorithms for vehicle deceleration may be carried out.

It is also advantageous if, when an unavoidable collision situation is recognized, an emergency call center or a telematic service is informed as to the instantaneous location of the vehicle and the fact that there has been a collision, which may be done with the aid of a cell phone installed in the vehicle. Thereby, help may be requested at the earliest possible point in time. An informed traffic control center, emergency call center or telematic service, shortly after receiving this information, may call back the device that has dispatched the request for help, in order to confirm the occurrence of the precalculated collision and to prepare for a targeted assistance.

A control element may be provided for implementation of exemplary method according to the present invention for controlling an adaptive distance control and speed control. In this context, a program capable of running on a computer, in particular on a microprocessor, may be stored on the control element. An electric memory medium such as a read-only memory may be used in particular as the control element.

Thus, the present invention relates to a method and a device for automatically triggering a deceleration of a vehicle to prevent a collision with another object or to reduce damages associated with an impending collision with another object, objects in the range of the vehicle's course being detected using signals of an apparatus for sending and receiving radar signals or lidar signals, or of an apparatus for receiving video signals, an endangerment potential is determined as a function of the object detected, and, as a function of the endangerment potential, the deceleration arrangement is activated in at least three states, of which at least one state puts the deceleration arrangement of the vehicle into a state of preparing to brake. Furthermore, other vehicle functions may be executed as a function of the endangerment potential, whereby passenger safety in this travel situation is enhanced.

DETAILED DESCRIPTION

Figure 1:
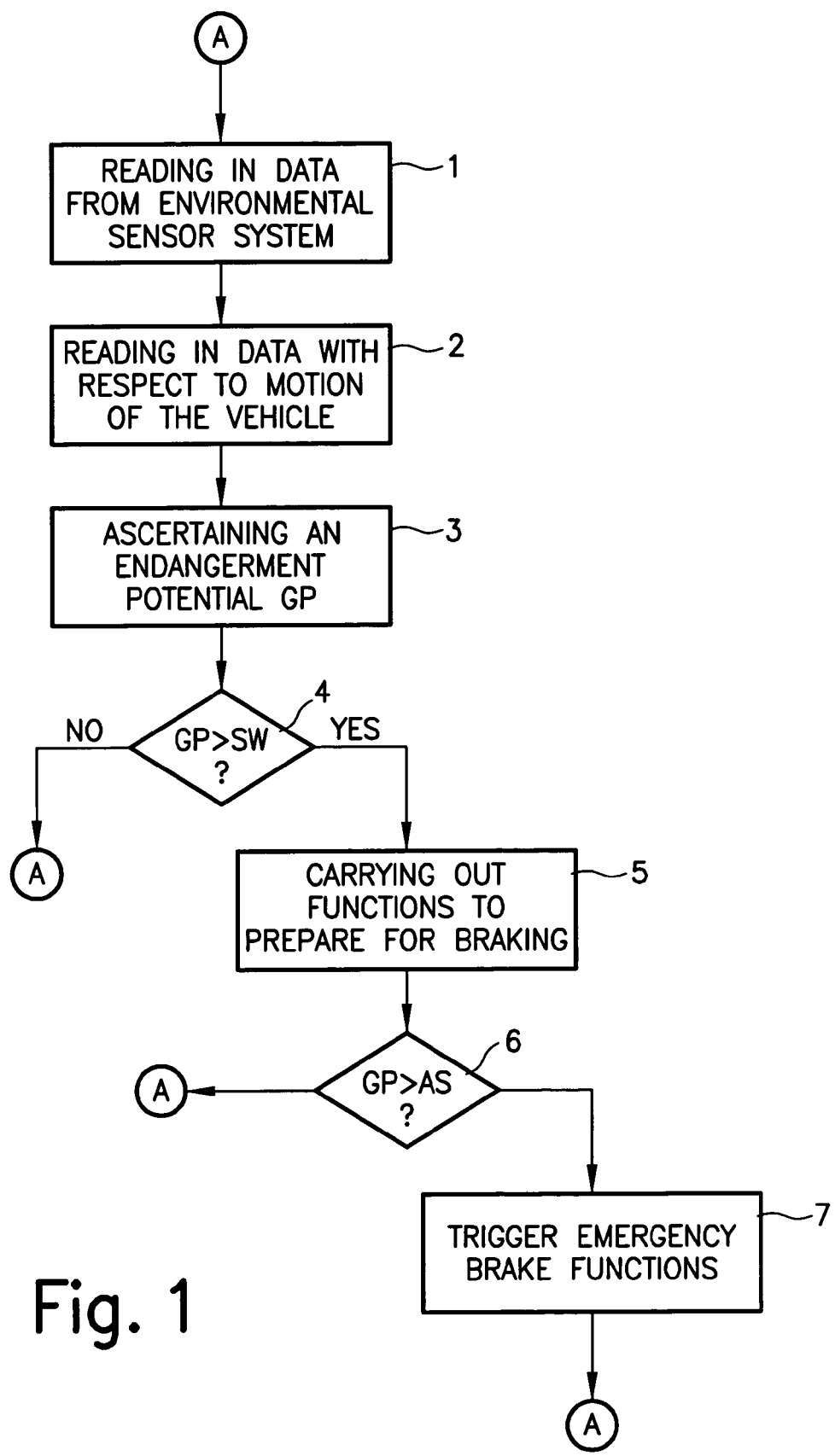
FIG. 1 is a flow diagram for carrying out an exemplary method according to the present invention.

FIG. 1 shows a flowchart of an exemplary method according to the present invention. This method may be implemented in the form of a program that may be run on a microprocessor. The flow diagram is a method which, after being started, is repeated any number of times and when it reaches end A, it returns to beginning A. In step 1, data is received from an environment sensor system with which the vehicle is equipped. The environment sensor system may be implemented as a device for sending and receiving radar or lidar signals, or an apparatus for receiving video signals. The data read in describe objects within the range of being recorded by the sensor system, and are made up at least of the variables relative position of the object with respect to the vehicle, relative speed of the object and distance of the object from the vehicle. Additional variables which can be made available by the environment sensing system are, for example, horizontal extension of the object, vertical extension of the object, geometry of the object or the surface nature of the area of reflection. In step 2, data is received that describes the motions of one's own vehicle. The source of this data are sensors and accompanying electronics for determining one's own vehicle speed, yaw rate, vehicle motion direction in relation to the longitudinal vehicle axis (attitude angle sensor), brake pedal operation, accelerator operation or steering angle sensor. In step 3, a current endangerment potential GP is determined from the data of the environment sensor system as well as from data that characterize one's own driving behavior. The endangerment potential describes the probability that a collision with an object detected by the environment sensor system is unavoidable. In subsequent step 4, a decision is made to test whether the instantaneous endangerment potential GP is greater than a predefinable threshold value SW. This threshold value SW represents the endangerment potential triggering threshold. If the endangerment potential GP lies below this endangerment potential triggering threshold SW or is equal to it, the method branches the flow diagram directly to circle A and returns to the beginning, whereupon it runs through again. If the decision in step 4 was answered "yes", and the instantaneous endangerment potential GP is greater than endangerment potential triggering threshold SW, then step 5 arranges for the braking system to be prepared for an impending emergency braking or full braking, since an immediately imminent collision has to be reckoned with. According to an embodiment of the present invention, this preparation takes place by prefilling the braking system and causing a braking pressure buildup which is metered in such a way that the brake linings lie against the brake disks, but no significant deceleration effect occurs as yet. Along with the preparation of the braking system, additional vehicle functions are also carried out in order to enhance occupant safety in case of a collision. Additional vehicle operations may include setting the engine to idling speed or deactivating the engine, switching the transmission to a neutral setting, so that no force transmission can take place, activating the reversible passenger restraint systems, modifying the triggering thresholds of the irreversible passenger restraint systems so that they correspond to the current endangerment potential, modifying a control device for controlling a braking intervention and/or an engine adjustment for stabilizing the vehicle motion so that it is optimized for a powerful deceleration, warning the other traffic participants by activating the travel direction indicators and/or the horn, informing the subsequent vehicles by a radio transmission concerning the impending deceleration of the vehicle, storing data on the detected objects in the vehicle environment and data which characterize one's own driving behavior in a nonvolatile memory device, and/or, using radio transmission to informing a traffic control center or an emergency call center about the vehicle position (which may be determined using a satellite-supported position finding method).

In Step 6, it is determined whether the endangerment potential GP is greater than a triggering threshold AS. This triggering threshold AS is the value which, when it is exceeded, automatically triggers a vehicle deceleration for preventing a collision with another object. If the interrogation in step 6 was answered "no", and the endangerment potential GP is smaller than, or equal to the triggering threshold value AS, the flow diagram branches to circle A and returns to the beginning, from where it is run through again. If it is determined in step 6 that the endangerment potential GP is greater than triggering threshold value AS, then in step 7, an automatic triggering of full braking or emergency braking takes place, so as to avoid a collision. Subsequently to step 7, the flow diagram arrives again at a circle A, from where it returns to the beginning and starts over again. It should further be mentioned that triggering threshold value AS is greater than endangerment potential threshold value SW, since the functions which prepare for deceleration are carried out before the triggering of the deceleration itself. It is noted that the value AS and the value SW may be very close to each other, since false activations of the deceleration-preparing functions should be excluded to the greatest extent possible. However, when there is a rapid increase in the endangerment potential GP, sufficient time remains between the exceeding of endangerment potential threshold value SW and the exceeding of triggering threshold value AS, so that one can carry out a complete braking preparation in the above-described manner, before initiating the deceleration. If one of action steps 5 or 7 is activated, and in the further course it turns out during a renewed cycle iteration of the method described that the activation conditions are no longer present, then a deactivation or resetting of these functions may be performed in various ways. For example, when a condition is no longer satisfied, a predefined time duration is allowed to pass, in which no renewed activity is allowed to occur, until the deactivation or resetting takes place. Another possibility is for the endangerment potential GP to undershoot another threshold value which is smaller than the activating threshold value, to initiate a resetting or deactivation of the triggered operation.

Figure 2:
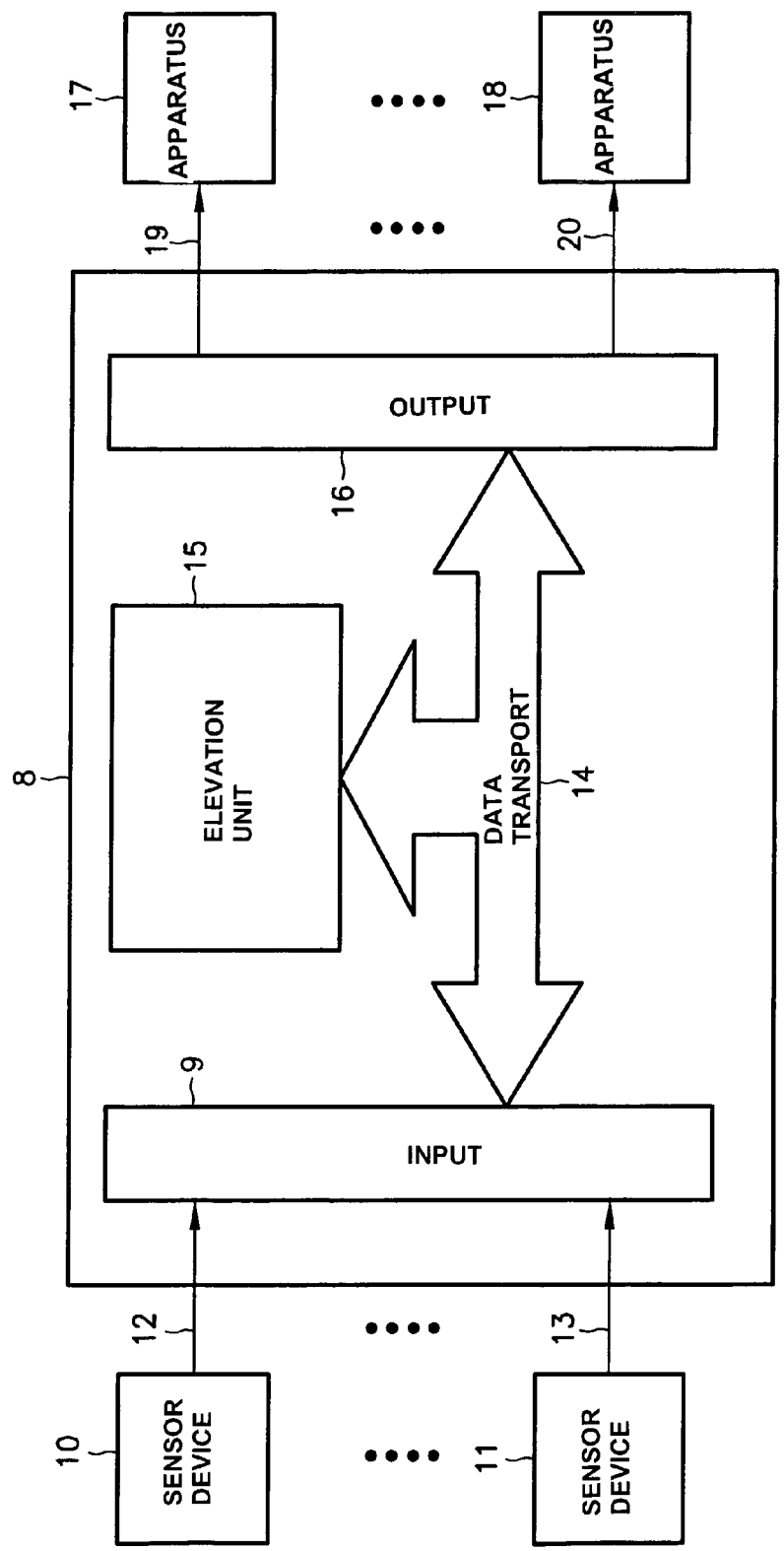
FIG. 2 is a block diagram of an exemplary device for carrying out the method according to the present invention.

FIG. 2 shows an exemplary device for carrying out the method described above. Device 8 for triggering brake preparation measures as well as vehicle deceleration includes an input field 9, to which one or more input signals 12 to 13 can be supplied by sensor devices 10 to 11. Sensor devices 10 and 11, may include a radar sensor, lidar sensor or video sensor, or a combination thereof, as well as other types of sensors for detecting one's own vehicle behavior. Such sensors may also include, for example, devices for determining vehicle speed, yaw rate, vehicle motion direction, brake pedal operation, accelerator operation or a steering angle, which may also be used in any combination desired. The signals arriving in input field 9 are supplied to an evaluation unit 15, using a data transport system 14. The method for triggering the vehicle deceleration so as to avoid a collision, and for triggering functions preparing for deceleration is carried out in evaluation unit 15. Depending upon the endangerment potential GP determined, which is calculated as a function of the vehicle situation and the environmental situation, this evaluation unit 15 emits signals which are supplied to an output field 16 using data transport system 14. In one exemplary embodiment, two output signals are used. A braking preparation signal is emitted when the decision in step 4 was answered "yes", whereupon the braking preparations described above are activated. A triggering signal is emitted when the decision in step 6 was answered "yes", whereupon the deceleration means of the vehicle carry out a braking operation. Signals 19 and 20 are supplied via output field 16 to apparatus 17 and 18, in which further processing is carried out. In the case of apparatus 17 and 18, which have output signals 19 to 20 supplied to them, a control unit is included for controlling the braking system, which is configured to carry out an automatic deceleration as a function of the output signals of device 8. Furthermore, apparatus 17 and 18 may include apparatus for carrying out or triggering the measures that prepare braking, for example, an engine control device which is able to reduce the engine speed to idling speed, or to deactivate the engine, a transmission control unit which can switch the transmission to a neutral setting, so that no force transmission can take place, and/or a restraint system control unit which is able to activate the reversible passenger restraint system, and which is able to modify the triggering thresholds of the irreversible passenger restraint systems in such a way that it is adjusted to the instantaneous endangerment potential. Furthermore, apparatus 17 and 18 may include a regulating unit for controlling a braking and/or engine adjustment for stabilizing the vehicle motion, which is modified in such a way that it is optimized for a powerful vehicle deceleration, or an apparatus for activating the travel direction indicators and/or the horn, so that the other traffic participants may be warned, or an apparatus for radio transmission, which is able to inform the subsequent vehicles concerning the impending deceleration of the vehicle, or a nonvolatile memory device which stores data of the detected objects in the vehicle's environment and data which characterize the driving behavior of one's own vehicle, and/or an apparatus for radio transmission, which informs a traffic control center or an emergency call center about the vehicle position which was determined using a satellite-supported position finding method.

In addition to the above, controlling of the deceleration arrangement of the vehicle as a function of a determined endangerment potential may include an operating state in which the decelerating arrangement is operated with front wheels blocked and rear vehicle wheels free.

What is claimed is:

1. A method for automatically triggering a deceleration of a vehicle to one of prevent a collision with another object and reduce consequences of an impending collision with the another object, the method comprising:
   detecting objects in a range of a course of the vehicle using at least one of radar, lidar and video;
   recording motion variables of the vehicle;
   determining an endangerment potential as a function of a detected object and of the motion variables; and
   controlling a deceleration arrangement of the vehicle as a function of a determined endangerment potential, the deceleration arrangement being operable in a plurality of states including:
   a first state in which the decelerating arrangement is inactive;
   a second state in which the decelerating arrangement is operated to prepare the vehicle for braking; and
   a third state in which the deceleration arrangement is operated with a deceleration value that is below a maximum deceleration; and
   a fourth state in which the decelerating arrangement is operated with a deceleration value that corresponds approximately to a maximum deceleration; and
   a fifth state in which the decelerating arrangement is operated with front wheels blocked and rear vehicle wheels free.

2. The method of claim 1, wherein in the second state, pressure in a braking system of the vehicle is built up so that brake linings lie against brake disks without having a significant braking effect appear.

3. The method of claim 1, further comprising:
   after determining the endangerment potential, performing at least one of the following:
   a) one of reducing an engine of the vehicle to an idling speed and deactivating the engine;
   b) switching a transmission of the vehicle to a neutral setting, so that no force transmission occurs;
   c) activating a reversible passenger restraint system of the vehicle;
   d) modifying a triggering threshold of the irreversible passenger restraint system to correspond to a current endangerment potential;
   e) modifying at least one of a braking intervention control device and an engine adjustment to stabilize vehicle motion to optimize the vehicle motion for a powerful vehicle deceleration;
   f) warning another traffic participant by activating at least one of a travel direction indicator device and a horn;
   g) informing another vehicle by a first radio transmission of an impending deceleration of the vehicle;
   h) storing data concerning the detected object in the vehicle environment and data concerning vehicle driving behavior in a nonvolatile memory device; and
   i) informing one of a traffic control center and an emergency call center using a second radio transmission about a vehicle position.

4. The method of claim 3, wherein in step i), the vehicle position is determined using a satellite-supported position finding process.

5. A device for automatically triggering a deceleration of a vehicle to prevent a collision with an object or to reduce consequences of an impending collision with the object, the device comprising:
   a receiving arrangement to receive signals from at least one of a radar arrangement, a lidar arrangement and a video arrangement, the signals indicating an object in a range of a course of the vehicle;

a determining arrangement to determine an endangerment potential as a function of a detected object;

a control arrangement to control a vehicle deceleration device and to reset the deceleration device to a state to prepare for braking when a predefined endangerment potential threshold value is exceeded which is less than a triggering threshold value for the deceleration;

an engine control device to one of reduce the engine speed to an idling speed and deactivate the engine;

a transmission control unit to switch the transmission to a neutral setting, so that no force transmission takes place;

a restraint system control device to activate a reversible passenger restraint system;

a restraint system control device to modify a triggering threshold of the irreversible passenger restraint system to adjust it to a current endangerment potential;

a control device to control at least one of a braking intervention and an engine adjustment for stabilizing the vehicle motion so that the vehicle motion is optimized for a powerful vehicle deceleration;

a device to activate at least one of a travel direction indicator device and a horn to warn another traffic participant;

a radio transmitter to inform a following vehicle concerning an impending deceleration of the vehicle;

a nonvolatile memory device to store data concerning the detected object in a vehicle environment and data concerning a vehicle driving behavior;

a radio transmitter to inform one of a traffic control center and an emergency call center about a vehicle position determined using a satellite-supported position finding process.

\* \* \* \* \*